United States Patent

Evalds

[15] 3,648,077

[45] Mar. 7, 1972

[54] CIRCUIT FOR CONTROLLING A HEAT-GENERATING DEVICE

[72] Inventor: Egils Evalds, 124 Linwood Avenue, Ardmore, Pa. 19003

[22] Filed: Dec. 3, 1969

[21] Appl. No.: 881,707

[52] U.S. Cl. ..........307/252 B, 307/310

[51] Int. Cl. ..........H03k 17/00

[58] Field of Search ..........307/310, 252 B, 252 L, 252 T; 219/501

[56] References Cited

UNITED STATES PATENTS

| | | | |
|---|---|---|---|
| 3,324,352 | 6/1967 | Hover | 307/252.21 |
| 3,372,328 | 3/1968 | Pinckaers | 307/252.52 |
| 3,449,599 | 6/1969 | Henry | 307/310 |

*Primary Examiner*—Donald D. Forrer

*Assistant Examiner*—B. P. Davis

*Attorney*—William E. Cleaver

[57] ABSTRACT

The present circuit employs the combination of a balanced bridge and a balanced differential amplifier to effect a continuous control of energy being supplied to a heat-generating device. The present circuit, in effecting said continuous control, has the capability of rapidly turning on said heat generating device and rapidly turning off said heat-generating device as well as effecting controls at all of the levels in between. A first electronic switch is coupled to the combination of a balanced bridge and a balanced differential amplifier and is responsive to the output therefrom to in turn trigger a second electronic switch which actually operates to permit energy to be transferred to the heating device. In addition, the present circuit employs a means to generate a substantially square wave input which serves to effect better regulation of the system. Further, the present circuit is designed to electrically isolate the load circuit from the control circuit.

1 Claims, 2 Drawing Figures

INVENTOR.
Egils Evalds
BY William E. Graves
ATTORNEYS.

CIRCUIT FOR CONTROLLING A HEAT-GENERATING DEVICE

BACKGROUND

In circuits which are designed to effect a control function which is dependent upon, or acts in response to, a temperature condition at some particular location or point, there are a number of inherent problems. Such circuits usually have the problem of overshoot, i.e., the circuit is turned off in response to the predetermined temperature condition but the heat generation continues for some time thereafter and hence the temperature of the object at the location which is being monitored actually increases beyond that which the monitor intended. The foregoing problem arises because normally the circuit response is relatively slow in reacting to the threshold temperature condition. In addition, such circuits very often respond to spurious signals such as transient signals or supply voltage variations as well as ambient temperature changes which cause the monitoring circuits to respond as though the temperature-sensitive element was experiencing a particular temperature condition. Further, in such circuits there is the problem that the load circuit (heat generating device) very often requires a relatively large electrical current and of course if the load circuit is connected to the circuit with which the operator comes in contact these currents can be dangerous to the operator. In the prior art, systems which take into consideration each of these problems and compensate therefor often are burdened by elaborate electronic circuitry.

SUMMARY

The present circuit operates in a current switching sense rather than in a voltage mode. The present circuit provides an electronic switch which is responsive to the application of electrical current to its control element. The electrical current last mentioned is provided by the combination of a balanced bridge and a balanced differential amplifier circuit which because of its nature can gradually reduce the current to said electronic switch. Such a gradual reduction of current acts to gradually reduce the heat which is being generated and reduce the effects of any heat generation inertia, while at the same time said circuitry is capable of rapidly supplying or cutting off current to said electronic switch to rapidly generate heat or to rapidly terminate the generation of said heat, respectively. In addition the present circuit has high stability in that the differential amplifier mitigates the effect of line voltage charges and spurious ambient temperature changes. At the same time the circuit provides a sharply defined trigger point which is readily repeatable.

The objects and features of the present invention can be best understood by considering the following description in conjunction with the drawings in which.

Figure 1:
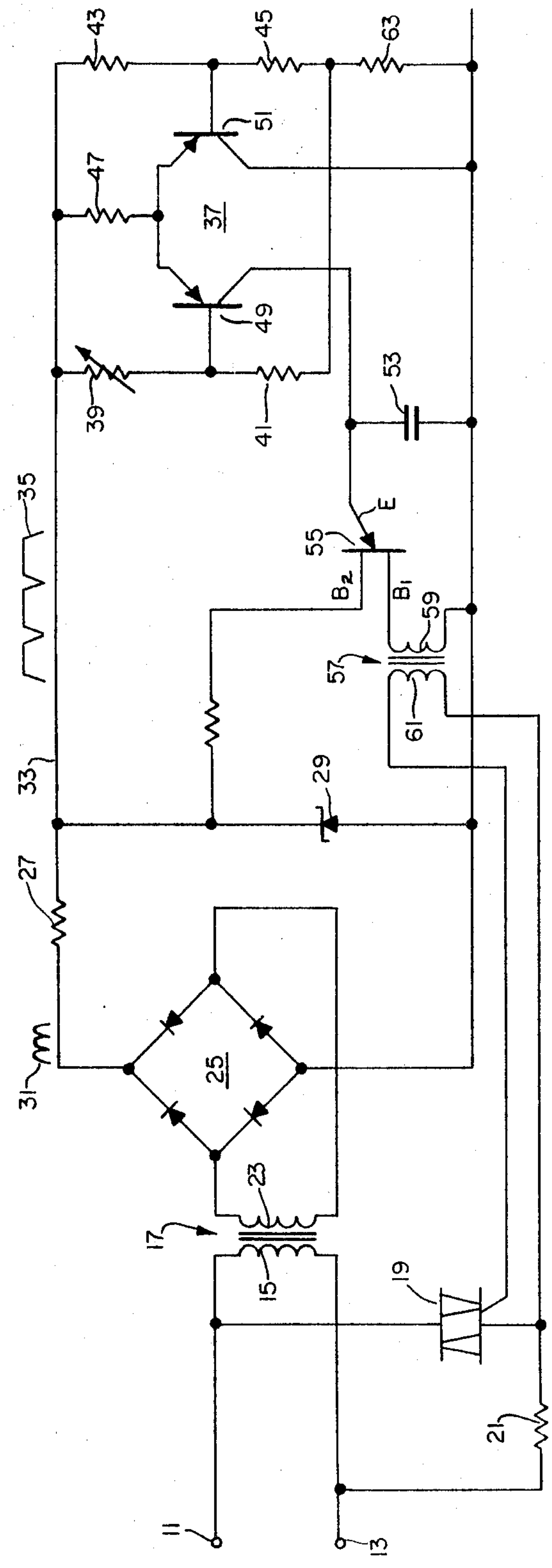
FIG. 1 is a schematic of the present circuit.

In FIG. 1 there is shown input supply terminals 11 and 13 which are connected to the primary winding 15 of the transformer 17. Connected across the input lines is a triac 19 and further connected in series therewith is a heat generating element 21. It should be understood that the triac 19 could be a silicon-controlled rectifier or any other device which can be initially turned on by a control signal and which will continue to conduct until the supply voltage has been diminished or cut off, i.e., a device which in general acts similar to a thyratron. The secondary winding 23 of the transformer 17 is connected to a full wave rectifier 25 across which there is connected a resistor 27 in series with a Zener diode 29.

Accordingly when the AC signal is supplied to the input terminals 11 and 13 and is transmitted across the transformer 17 it is full wave rectified at the rectifier 25 to provide a pulsating DC current such as depicted by the graphic illustration 31. As is well understood when the pulsating DC signal passes a certain threshold, the Zener diode 29 breaks down and commences conducting so that on the line 33 there appears a substantially square wave such as the wave depicted by the graph 35.

The signal 35 is applied to the combination balanced bridge and balanced differential amplifier current 37. The bridge-difference amplifier circuit 37 is composed of the temperature-sensitive element 39 (which constitutes one leg of the bridge and which may be a thermistor), three other resistors 41, 43 and 45 (which comprise the remaining three legs of the bridge), a current limiting resistor 47 as well as the transistors 49 and 51. It will be noted that the transistors 49 and 51 are PNP-transistors and therefore respond to a negative bias between the emitter and the base. If the bridge circuit is in balance then the current flow across the respective resistors 39 and 43 will provide a negative bias respectively to the transistors 49 and 51 and hence each of these transistors would be conducting. However, if the temperature-sensitive element 39 is in its "cold" state then the resistance thereof is very high and hence the bias or voltage developed thereacross is relatively large so that the transistor 49 conducts very heavily. When the transistor 49 conducts very heavily the voltage developed across the resistor 47 is rather substantial and hence the transistor 51 becomes back biased, i.e., the voltage at the base of the transistor 51 is more positive than the voltage at the emitter. The resistor 63 is chosen to be a large resistor in order to limit the current through the bridge-difference amplifier circuit 37, thereby reducing self heating in bridge resistors and permitting transistors 49 and 51 to operate with high collector voltages.

It becomes apparent then that when the temperature-sensitive element is exposed to a "cold" condition, the transistor 49 conducts heavily and the transistor 51 is cut off. Under the foregoing circumstances the condensor 53 becomes charged rapidly and hence the potential applied to the unijunction transistor 55 rises quite rapidly. The condensor 53 is chosen in the preferred embodiment such that when the potential developed thereon is 75 percent of the potential between base 2 ($B_2$) and base 1 ($B_1$) of the unijunction transistor 55, the unijunction transistor 55 is turned on. It should also be apparent that when the transistor 49 is conducting heavily the time required to charge the condensor 53 to 75 percent of the potential applied between $B_2$ and $B_1$ is a short period of time. It should be understood that while in the preferred embodiment the threshold voltage is 75 percent of the voltage applied to between the bases $B_1$ and $B_2$ other values could be chosen and unijunction transistor and capacitor need only be selected to effect this circuit design parameter. In other words, inasmuch as the unijunction transistor 55 eventually acts to trigger the triac 19 and which thereby permits energy to be supplied to the heat generator 21, the circuit could be designed to turn the unijunction transistor 55 on early or later depending upon the choice thereof and the selection of the capacitor 53. Current input into capacitor 53 gives linear voltage rise, not asymptotic, thus giving sharper determination to the trigger action.

In the "turn off" operation, it should be apparent that when the temperature responsive element 39 becomes warm the resistance thereof decreases and hence the voltage drop thereacross is diminished so that the bias between the emitter and base of the transistor 49 is diminished and the transistor 49 conducts only slightly. Under these conditions as the bridge becomes unbalanced the transistor 51 conducts more heavily and as the voltage across resistor 47 increases the transistor 49 becomes back-biased and is ultimately turned off. As can be readily understood from the above discussion, the current can be shifted from the transistor 49 to the transistor 51 and vice versa very rapidly and thus the circuit provides a truly responsive action to rapid changes in temperature conditions. On the other hand, it can be well understood that the current shift from the transistor 49 to the transistor 51 and vice versa can be gradual or in some cyclical fashion depending upon the temperature condition to which the thermal element 39 is exposed. Accordingly, the combination balanced bridge and differential amplifier 37 provides a feature whereby the circuit can respond instantaneously and can respond also gradually to control the unijunction transistor 55. The differential amplifier 37 also responds symmetrically to ambient temperature changes on transistors, thus eliminating drifts.

When the unijunction transistor 55 is rendered conducting current is passed through the primary winding 59 of the pulse transformer 57 and accordingly there is a difference of potential developed across the secondary winding 61. The secondary winding 61 is connected to the control element and the output element of the triac 19 and when the difference of potential is developed thereacross, the triac 19 commences to conduct thereby providing current or energy to the heat-generating device 21.

Figure 2:
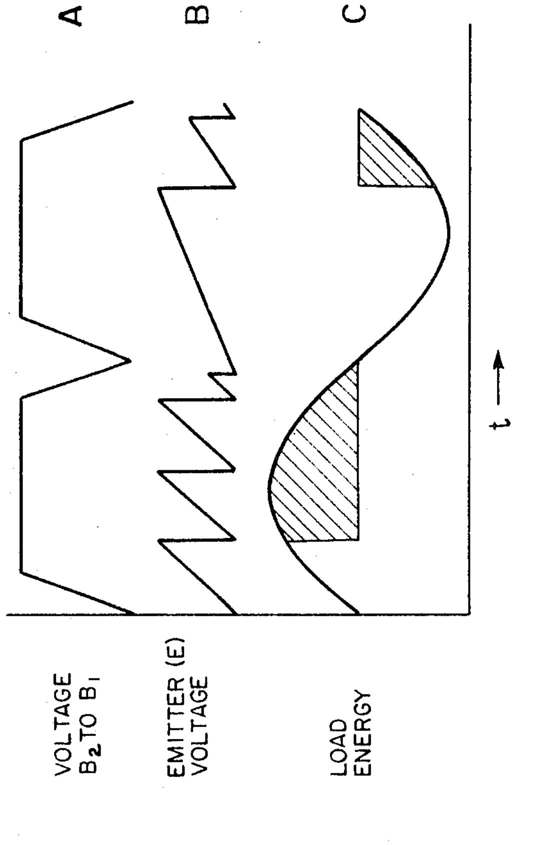
FIG. 2 is a graphic illustration of the signal conditions at significant points and the circuit.

The relationship between the voltage developed across the unijunction transistor and the voltage developed across the capacitor 53 as well as the energy to the load can be seen in FIG. 2. It will be noted in FIG. 2 that the Graph A which represents the potential difference between the base 2 and the base 1 of the unijunction transistor 55 follows the pattern shown at 35; that is, the pattern which is developed as a result of applying the pulsating DC signal 31 to the Zener diode 29. The voltage which is developed across the base elements $B_2$ and $B_1$ of the unijunction transistor 55 is not truly a rectangular pulse but it is a pulse which has a rather substantial plateau or flat top. As explained earlier this same flattop pulse is applied across the balanced bridge differential amplifier circuit 37. The Graph B depicts two different situations with respect to the voltage developed across the capacitor 53 and hence the potential developed at the emitter E of the unijunction transistor 55. In the first half of the graph there is depicted a situation where the thermal-responsive element 39 is in a "-cold" state and therefore has a high resistance. Under the foregoing circumstances the transistor 49 is conducting heavily. In such a situation the potential developed across the capacitor 53 will rapidly rise to 75 percent of the potential between the bases $B_2$ and $B_1$ and hence the unijunction transistor will be turned on or biased into a conducting state very early in the half-cycle of the signal applied. This can be seen in the first half of Graph B. It will be noted that the voltage developed at the emitter E rises linearly and gets to the 75 percent level very early in the cycle time. Once the 75 percent level is reached the unijunction transistor 55 fires and the capacitor 53 discharges. Thereafter as long as the transistor 49 conducts heavily the capacitor 53 will continue to charge up and discharge in response to the firing of the unijunction transistor 55. However, the repeated charging and discharging of capacitor 53 does not affect the operation of the triac 19. Once the triac has been turned on it remains conducting until the input voltage at points 11 and 13 goes through the "zero" crossover. Hence the hatched portion of the Graph C which represents the time period during which current flows to the load 21 starts very early in the cycle time period.

In the second half of the Graph B there is depicted a condition wherein the capacitor 53 takes a relatively long period of time to be charged to the 75 percent level. This would be a condition under which the thermal element 39 is relatively warm and hence the voltage drop thereacross is relatively low and the current conduction has been switched for the most part from the transistor 49 to the transistor 51. Under these set of circumstances the capacitor 53 takes a long period of time to reach the 75 percent level at which time the unijunction transistor 55 conducts. While the capacitor 53 may be repeatedly charged and discharged this procedure has no effect on the triac 19. As is shown in the Graph C by the hatched areas once the unijunction transistor 55 conducts, during the latter part of the second half of the cycle, there is energy or electrical current transmitted to the load 21.

If consideration be given to the problem it can be understood that if there are spurious signals developed at the input circuit or there is a change in the line voltage this change in the signal input would be damped out or ineffective because once the Zener diode has "fired," changes in the voltage are ineffective and the system merely sees a DC condition. Accordingly the system is relatively immune to spurious signals or changes in the input voltage level. In addition, since the balanced bridge-differential amplifier circuit is subjected to pulsating DC input or half-wave signals the capacitor 53 is discharged each half-cycle and the pattern of transmitting energy to the load is therefore repeated each half-cycle. Accordingly the increment in which the system can respond is the half-cycle of the input signal which provides a very good response for the overall system. In other words as the thermal element 39 experiences a temperature change, each half-cycle that temperature change is monitored and the energy supplied to the load is the energy which is responsive to the latest half-cycle of monitoring the thermal element. Since the switching of the current from the transistor 49 to the transistor 51 can be effected in a time period within the half-cycle it is of course possible (although highly unnecessary in view of other conditions in the system) to have the system go from a rapid turn on to a rapid turnoff within a half-cycle. Hence the flexibility and the high response characteristic which is made possible by the current mode of operation becomes apparent. Further as mentioned earlier, since the charging of capacitor 53 is linear there is a well-defined trigger point even in the case of imperfect voltage regulation. Also as mentioned earlier, the balanced differential amplifier dampens the effect of ambient temperature changes affecting the transistors, etc. It should also be noted that the circuit is relatively inexpensive because there is only a simple power supply and a simple amplifier involved.

What is claimed is:

1. A circuit for controlling a heat-generating device comprising in combination a bridge circuit having first and second input sides and first and second output terminals, one leg of said bridge circuit being a temperature-responsive element; capacitor means having first and second terminals; first and second transistor means each having a base element, an emitter element and a collector element, said base element of said first transistor connected to said first output terminal, said base element of said second transistor connected to said second output terminal, said emitter elements of said first and second transistors circuitry connected in common to said first input side of said bridge circuit, said first terminal of said capacitor means connected to said collector of said first transistor and said second terminal of said capacitor means connected to said second side of said bridge and said collector of said second transistor; unijunction transistor means having a control element, input element and an output element, said control element connected to said first terminal of said capacitor means, said input element connected to said first side of said bridge; pulse transformer means having a primary winding and a secondary winding, said primary winding connected across said output element of said unijunction transistor and said second side of said bridge; triac means having a control element and connected to provide electrical power to said heat-generating means, said control element of said triac means connected to said secondary winding of said pulse transformer whereby when the temperature affecting said temperature-responsive element changes the current flow through said first and said second transistor shifts thereby changing the time at which said capacitor means is sufficiently charged to cause said unijunction transistor to conduct and therefore said triac to provide power to said heating element.

* * * * *